United States Patent [19]

Roe

[11] 4,176,471
[45] Dec. 4, 1979

[54] MARCHING GUIDE

[76] Inventor: Thomas J. Roe, P.O. Box 261, Rte. 7, Bel-Clare Acres, St. Cloud, Minn. 56301

[21] Appl. No.: 858,706

[22] Filed: Dec. 8, 1977

[51] Int. Cl.² .................. A63B 71/00; G09B 19/00
[52] U.S. Cl. .................................................. 35/29 R
[58] Field of Search ............. 35/29 R, 29 C, 54, 8 R; 273/1 A; 28/161; 428/105, 102, 109; 139/416, 417; 24/204

[56] References Cited

U.S. PATENT DOCUMENTS

| | | | |
|---|---|---|---|
| D. 172,987 | 9/1954 | Quigley | 273/1 A |
| 1,277,645 | 9/1918 | Rothkugel | 35/29 C |
| 1,342,259 | 6/1920 | Feldman | 139/417 |
| 1,815,443 | 7/1931 | Mitchell | 35/29 C |
| 2,017,536 | 10/1935 | Hase et al. | 273/1 A |
| 2,272,229 | 2/1942 | Tucker | 139/383 R |
| 2,577,667 | 12/1951 | Warte | 139/416 X |
| 2,685,140 | 8/1954 | Newick | 35/29 R |
| 2,969,985 | 1/1961 | Batt | 273/1 A |
| 3,139,281 | 6/1964 | Nicholson | 273/1 A |
| 3,433,480 | 3/1969 | Coleman et al. | 273/57 X |
| 3,515,385 | 6/1970 | Gunderson | 273/1 A |
| 3,768,809 | 10/1973 | Ciarfello | 273/1 A |
| 3,847,110 | 11/1974 | Inoue | 24/204 |
| 4,078,793 | 3/1978 | Allen | 273/1 A |
| 4,079,767 | 3/1978 | Howard | 24/204 X |

FOREIGN PATENT DOCUMENTS 49 of 1874 United Kingdom .................... 35/29 R

OTHER PUBLICATIONS

Publ. "The NPO Footprint Guide," by Medical Motivation Systems, Inc., 1970, 3 pages (667–665).

Primary Examiner—Daniel M. Yasich
Attorney, Agent, or Firm—Merchant, Gould, Smith, Edell, Welter & Schmidt

[57] ABSTRACT

A marching guide comprising an elongate runner of flexible, foldable material with the plurality of transverse pace marker members attached thereto. The runner may be folded or rolled up when not in use, and may be spread out and taped to a floor or staked if outdoors for use. The pace markers which may comprise sewn-in rods or lengths of rope are spaced according to the length of the marching pace, and optional removable intermediate markers can be provided for half-pace training. Attachment means are provided for attaching successive lengths of marching guide in linear or angled relationship for pattern marching practice. The transverse pace marker members provide a tactile reference mark for the marching student as an aid in teaching the proper marching pace.

18 Claims, 12 Drawing Figures

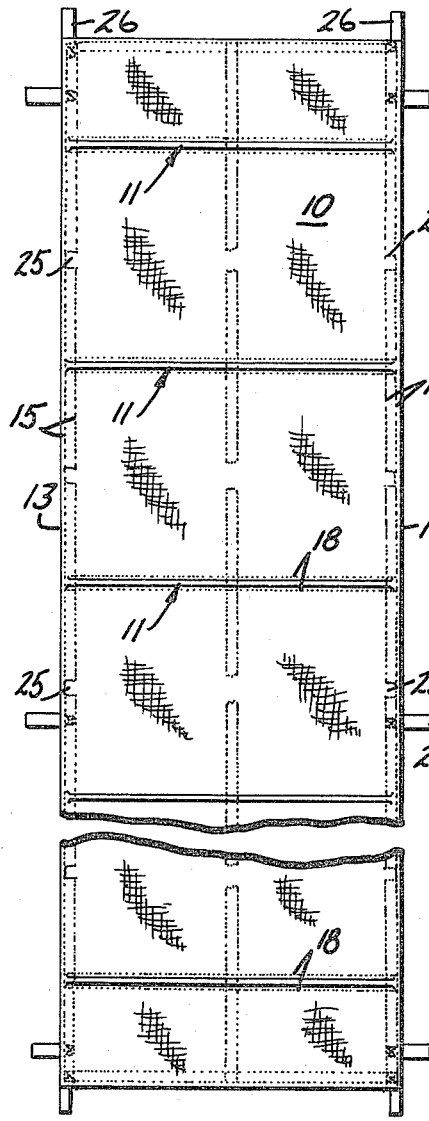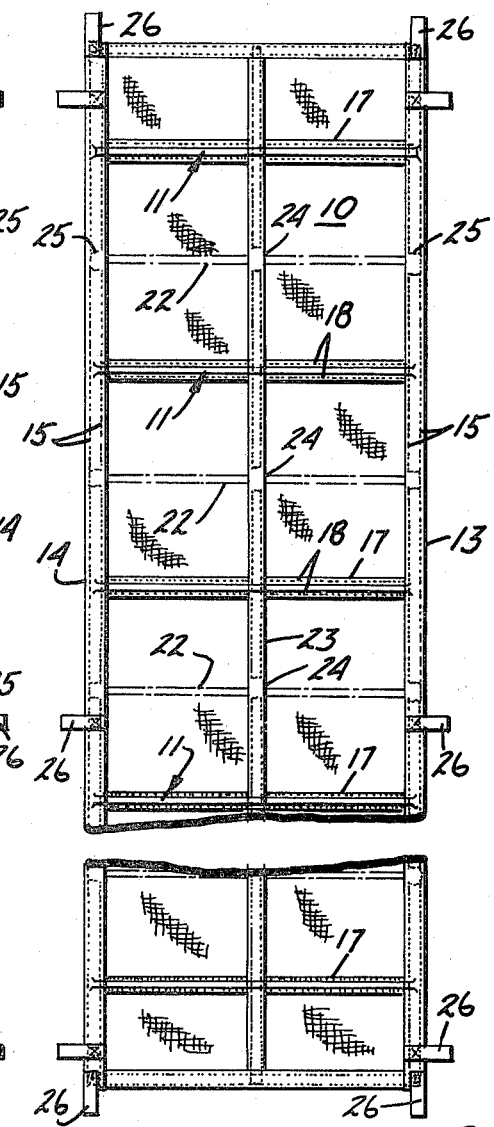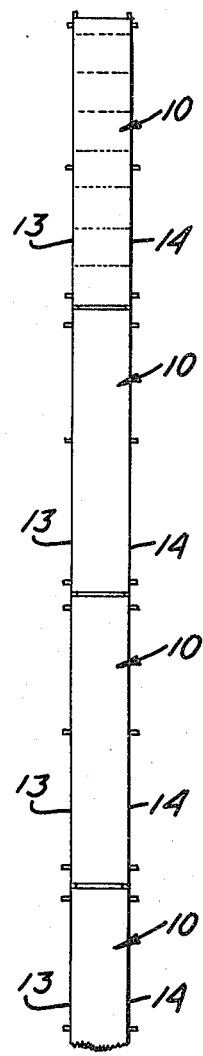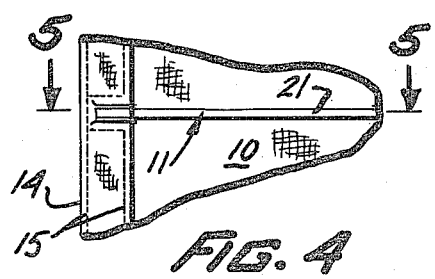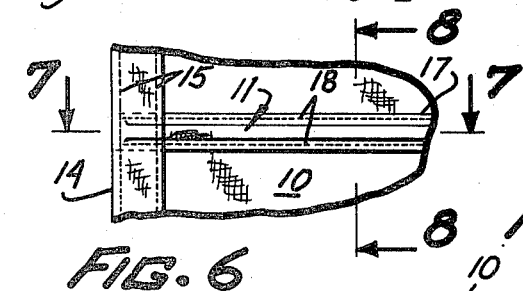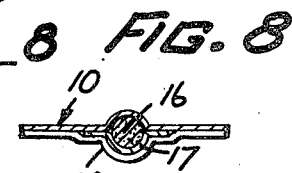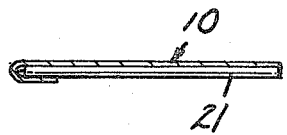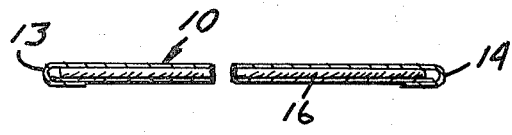

MARCHING GUIDE

BACKGROUND OF THE INVENTION

The present invention pertains to a marching guide for teaching student members of marching bands, drill teams and the like, the correct marching pace length.

One of the first and most fundamental things that must be taught to beginning marching students is the correct pace length. If the correct pace length is not acquired by the student, difficulty will be encountered in keeping straight ranks and files in the marching formation, and as a result all marching formations and drill maneuvers will be adversely affected. Once basic skills have been acquired, additional training must be given periodically to maintain proficiency.

In the case of marching bands which commonly give marching performances on football fields, the yard markers, occurring at five yard intervals, are commonly used as a reference in performing marching routines and performances. Typically, a stride length of 22½ inches is adopted, which provides eight paces per five yard marker. This also has the advantage of corresponding to eight counts of marching music. If the individual members of the marching band do not take the identical uniform 22½ inch strides, the rows will be out of line when crossing the five yard markers, and this will be very apparent to persons watching the marching performance.

Various techniques have been used to teach students the basic pace length. One method is to have the student march down a football field with instructions that every eighth step should coincide with a five yard marker. One problem with this method is that the student does not receive the reinforcing feedback that the step length was correct or incorrect until eight steps have taken place, and the student may tend to shorten up or stretch out the last few steps in order to make the five yard marker come out right, but of course this leads to irregular and uneven pacing. Another problem is that there are no yard markers when marching laterally of the football field. Another technique is to lay out chalk lines or other visual markers at every step during practice sessions. While this provides positive feedback to the student as to the length of each step, it requires constant visual attention to the placing of the feet with the result that the student's accurate performance may become dependent upon the visual reference. Of course, this is not possible in most normal marching performance situations.

The prior art has proposed a number of methods for teaching foot placement in marching, walking, dancing and game playing. One prior art marching teaching technique involved taping lengths of rope across a floor, with each length transverse to the walking path, and spaced apart from the other lengths according to the desired pacing. A student may then march down the path. If the pacing is correct, each rope will be contacted by each foot at the same point, thereby providing an immediate tactile indication of the proper pace length. One difficulty with this type of guide is the necessity of measuring out the spacing and individually placing each of the ropes when the floor area is to be used for marching training.

One prior art stepping guide is the type shown in U.S. Pat. No. 1,815,443, issued to W. Mitchell. In that patent, a number of cut out footprints are provided which must be placed on the floor in predetermined locations according to the intended instructional program. This method also suffers the disadvantage that since the individual footprints are not connected to each other to automatically space them, it is necessary to measure out all locations for all footprints when the system is being set up.

Another type of guide known in the prior art is exemplified in U.S. Pat. No. 2,017,536 issued to Hase, et al. In that patent, a hopscotch game device is provided, comprising a number of pieces of rope which are connected at corners and bends by steel clamps in order to help give shape to the hopscotch apparatus. When stretched out, the hopscotch pattern is outlined by the lengths of rope, and the apparatus can be rolled or wadded up for storage. However, the Hase, et al. device is not suitable as a marching guide because the rope lengths are not secured in exact position and they would be easily dislodged a few inches either way by contact with the feet during normal marching, thereby impairing the accuracy of the device.

SUMMARY OF THE INVENTION

The present invention provides a marching guide for instructing students in the desired marching step length, which can be quickly and easily set up either outdoors or on a gymnasium floor. The guide comprises an elongate runner made of flexible material so that it can be folded or rolled when not in use. Means are provided to define a plurality of marker ridges at regularly spaced intervals according to the desired pace length. In a preferred embodiment, transverse pace marker members are provided, having sufficient thickness to provide tactile feedback of correct pace length to a student marching down the runner. Attachment means provided at the ends of the runner permit connection of successive runners either in linear or angularly intersecting fashion, so as to set up a desired marching pattern.

According to one preferred embodiment of the invention, the transverse pace marker members comprise rope or cord lengths positioned on the runner and held in place by a ribbon of material sewn to the runner. According to another preferred embodiment, the transverse marker member may be held in place by ribbons of material sewn along each edge and down the middle of the underside of the runner. Additional markers comprising rods or dowels can be removably placed at half pace intervals by slipping them in or out of gaps in the stitching of the ribbon to the runner.

BRIEF DESCRIPTION OF THE DRAWING

FIG. 1 is a view in top plan of a guide according to one embodiment of the present invention;

FIG. 2 is a view in bottom plan of the guide of FIG. 1;

FIG. 3 is a diagram illustrating the connection of a plurality of guides to form a linear marching pattern;

FIG. 4 is an enlarged detail of a portion of the guide of FIG. 2;

FIG. 5 is a view taken generally along line 5—5 of FIG. 4;

FIG. 6 is an enlarged detail of another portion of the guide of FIG. 2;

FIG. 7 is a view taken generally along line 7—7 of FIG. 6;

FIG. 8 is a view taken generally along line 8—8 of FIG. 6;

DESCRIPTION OF THE PREFERRED EMBODIMENT

Figure 9:
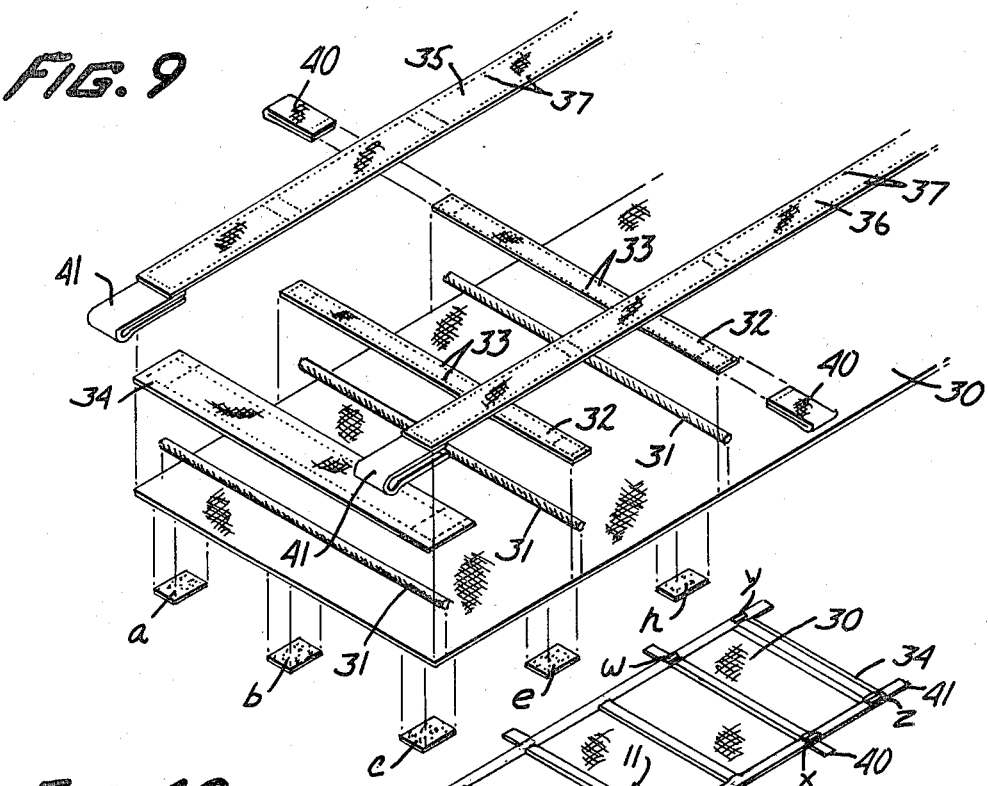
FIG. 9 is an exploded perspective view of a marching guide according to an alternate embodiment of the present invention.

One embodiment of the marching guide according to the present invention is shown in FIGS. 1 and 2. The top side, upon which the students would march is shown in FIG. 1, and the bottom side is shown in FIG. 2. The guide comprises an elongate runner of flexible material 10. In the preferred embodiment of FIGS. 1-8, runner 10 is preferably made of canvas having a marine, water-repellant, mildew resistant, dry finish, although it will be appreciated that any other suitable type of material could be used.

The guide includes means for defining a plurality of ridges indicated by reference number 11, at spaced intervals along the length of runner 10. The ridges run transversely to the longitudinal axis of the guide, and are spaced at intervals corresponding to the desired pace length, or a multiple thereof. These ridges are formed by pace marker members, which in the preferred embodiment are formed from lengths of rope or cord having a length approximately the width of the finished guide. As seen in FIGS. 7 and 8, the rope or cord lengths are indicated by reference number 16. Cords 16 are held in place by lengths of ribbon indicated by reference number 17. Ribbons 17 can be pieces of nylon webbing or other suitable material, and they are stitched in place by stitching 18 so as to sandwich cord 16 between runner 10 and ribbon 17.

The edges of runner 10 are identified by reference numbers 13 and 14, and are folded underneath and stitched in place by stitching 15, as seen in FIGS. 2 and 6. The turned under edge also overlaps cord 16 and ribbon 17.

The cords are thus held in place transverse to the length of the runner and at spaced intervals to define the pace marking ridges. The cords should be large enough in diameter, considering also the thickness of ribbons 17, to provide a positive tactile reference for the marcher, but they should not be so large as to present a tripping obstacle. In a preferred embodiment, a diameter of approximately of 5/16 inch was found to be satisfactory.

Provisions are also made in the embodiment of FIGS. 1-8 for inserting additional pace marker members at half pace intervals, on centers spaced halfway between adjacent sewn in cords. These locations are indicated in FIG. 2 by reference number 22. A wooden dowel of approximately 5/16 inch can optionally be inserted or removed, depending upon the intended instructional program. A medial ribbon of nylon webbing 23 can be provided along the underside of runner 10 extending substantially the length thereof, and secured thereto by stitching 18, as indicated in FIG. 2. Gaps are provided in the stitching 18 as indicated by reference number 24 to provide loops for the insertion of the dowels. Similarly, gaps in stitching 15 along the underturned edges 13 and 14 of the runner can be left, as indicated by reference numbers 25, at the appropriate places for insertion of the ends of dowels. As shown in greater detail in FIGS. 4 and 5, the dowel or other rod 21 can be inserted so that its ends fit into loops 25, and so that its center fits through loop 24. Alternatively, the dowel can be removed by bending back the edge of the runner and removing the dowel. Obviously, dowels or other rods could also be used for the sewn-in pace marker members in place of cords 16, if desired.

A plurality of tabs 26 are provided at intervals for securing the guide to the working surface. The tabs can be loops of ribbon or nylon webbing which are folded back and sewn in with the folded back edges of the runner. Additionally, the end tabs can be provided with fastening means so that successive lengths of runner can be interconnected. As explained more fully with respect to the embodiment of FIGS. 9-12, the fastening material can be hook and pile type fastening material patches.

In use, the marching guide of FIGS. 1-8 can be spread out on a floor or on the ground and secured by means of tabs 26. The students can then march down the length of runner 10, either blindfolded or not depending upon the instructional program. If the marching pace is correct, the feet will engage the successive pace marking ridges 11 at the same spot of the foot. If the pace is not correct, it will be immediately apparent to the student who can then alter his pace to the correct length. For half pace training, the optional dowels 21 can be inserted, or they can be left in place and merely stepped over during regular pace training.

A plurality of guides can be placed end to end as indicated in FIG. 3 in order to make an extended marching pattern. The individual sections can be angularly oriented with respect to each other, or they can be bent into curvilinear marching patterns, as desired. When not in use, the marching guide can be rolled or folded up for compact storage.

Figure 10:
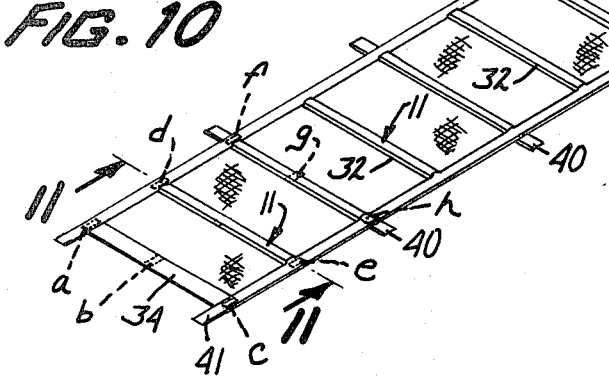
FIG. 10 is a view in perspective of a guide according to the embodiment of FIG. 9.
Figure 11:
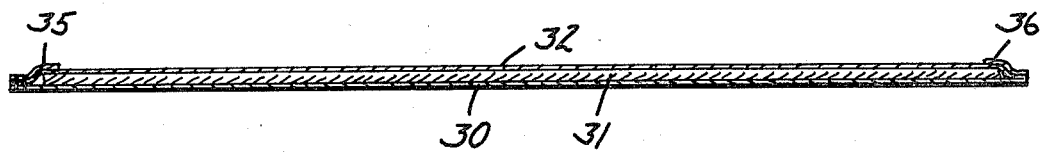
FIG. 11 is an enlarged view taken generally along line 11—11 of FIG. 10.

Referring now to FIGS. 9-11, an alternate embodiment of the present invention is shown. The alternate embodiment comprises an elongated rectangular runner 30 which is similar to runner 10 of the other embodiment. Runner 30 can be made of any flexible material, and in the preferred embodiment is made of reinforced vinyl. In this embodiment runner 30 is approximately 2 steps in width, which would be 45 inches in the case of a standard step length of 22½ inches. The runner is approximately 9 steps in length.

The spaced ridges 11 in this embodiment are formed by pace marker members comprising lengths of nylon cord or rope 31, having a length slightly less than the width of runner 30. Cords 31 are held in place transversely of runner 30, and are spaced apart from each other at intervals according to the desired pace. Ribbons of webbing material 32, are placed over cords 31 and stitched down along both sides as indicated by reference number 33. Marker cords 31 are thus held in place by being sandwiched between runner 30 and ribbons 32, and the stitching. At the end of the runner shown in FIG. 9, the cord may optionally be deleted since the last "pace" section is used for overlap as will be explained.

Additional lateral ribbons of nylon webbing or other suitable material 35 and 36 can be stitched as indicated by reference number 37 along the edges of runner 30. Ribbons 35 and 36 are stitched across the ends of ribbons 32 and marker cords 31 to close off the edges. A plurality of lateral tabs 40 can be sewn on at spaced intervals along the edges of the guide. These tabs can be formed from loops of webbing material folded back and stitched in with the ends of selected ones of ribbons 32, or they can be formed by extensions of those ribbons. Similarly, end tabs 41 can be formed from loops of webbing sewn in with the ends of lateral ribbons 35 and 36, or they can be formed by extensions thereof which are folded back and stitched down. As in the case of the previous embodiment, these loops can be used for taping or staking to secure the guide.

FIG. 11 shows in greater detail the sandwiching of a marker cord segment 31 between runner 30 and ribbon 32, with the ends being secured by lateral ribbons 35 and 36.

Patches of hook and pile type fastening material are provided at the ends of the guide for ease in attaching successive sections of the guide, either in linear or angular orientation. As seen in FIGS. 9 and 10, eight patches of hook (or pile) type material are sewn on the underside of runner 30 at location a-h, which correspond to the sides of the last three pace markers, and the middle of the last and second to last pace markers, including the end one which, as previously mentioned need not include a marker cord. At the other end of the guide as indicated in FIG. 10, four patches of mating pile (or hook) patches w-z are sewn on top of the guide, along the edges corresponding to the ends of the first two pace markers from that end.

Figure 12:
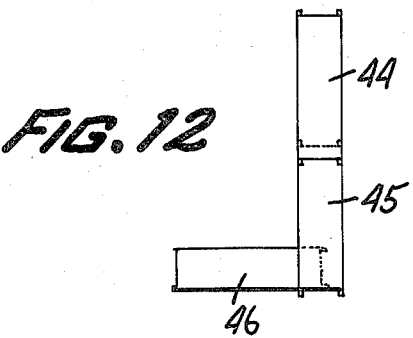
FIG. 12 is a diagram illustrating the attachment of a plurality of sections such as shown in FIG. 10 to form a marching pattern.

These fastening means permit the easy attachment of successive lengths to form an extended marching pattern, as indicated in FIG. 12. In FIG. 12, three guides of the type shown in FIGS. 9 and 10 are indicated by reference numbers 44, 45 and 46. With reference to FIGS. 10 and 12, fasteners w-z of guide 44 are not used, as it can be considered the starting end. The other end of guide 44 overlaps the beginning of guide 45 by one pace, so that fasteners a, c, d and e of guide 44 overlap and mate with fasteners w, x, y and z, respectively of guide 45.

An angular orientation is shown with respect to guides 45 and 46. The end of guide 45 overlaps the beginning of guide 46 so that fasteners f, a, g and b of guide 45 mate with fasteners w, x, y and z, respectively of guide 46. Alternatively, guide 46 could have been oriented in the opposite direction, utilizing fasteners c and h of guide 45.

The marker at the end of the guide between fasteners y and z can be considered the starting marker, and can be marked with a white stripe to simulate a five yard marker of a football field. This stripe could be screened on runner 30, or could be formed by using a overlying ribbon which is wider or of contrasting color. Similarly, the next to the last marker at the other end, the one between fasteners patches d and e corresponds to the next five yard marker and can be similarly marked with a wider stripe or one of contrasting color. When two guides are oriented as guides 44 and 45 of FIGS. 12, the end and beginning five yard markers for the two sections overlap, thus providing 8 paces or 5 yards per section. When 2 sections are oriented as sections 45 and 46 of FIG. 12, the eighth step or end 5 yard marker of section 45 defines the turning point for starting down section 46.

It is also possible to arrange a plurality of sections in curvilinear fashion by appropriate twisting or bending of the path and taping it to the floor in that manner. Angular junctions between successive sections of the guide can be made at other angles besides right angles by spacing them at the desired orientation and securing them to the floor or ground by means of tabs 40 and 41.

Ribbons 32 and runner 30 can be made of contrasting colors or shades to provide a visual reference of the proper marching step. Alternatively, they can be of the same color or shade to minimize reliance on visual cues, if desired.

While the invention has been described above in terms of several preferred embodiments, it will be appreciated that variations and modifications are possible in accordance with the broad concept of the invention. The fastening technique shown with respect to the embodiment of FIGS. 9-11 is equally applicable to the embodiment of FIGS. 1-8. It is also apparent that a wide choice of materials can be used according to the present invention. Also, different lengths, widths and marching step lengths can be accommodated.

As pointed out above, the present invention provides a marching guide for the instruction of correct marching step length. By attaching together a plurality of sections of the marching guide, extended patterns can be laid out for practice. The guide according to the present invention can be quickly and easily put into use by stretching it out on the marching surface, and it can be folded or rolled up for convenient storage when not in use. The pace marker ridges at regular intervals provide immediate feedback to the marching student for teaching the proper step length. In addition the guide can be used for teaching an entire column of students to march together down the guide so that they may learn proper visual spacing from the marcher ahead, in addition to learning proper marching pace. After initial skills have been acquired, the guide can be used for periodical proficiency reviews.

What is claimed is:

1. A marching guide for instructing step length in marching, comprising an elongate runner of flexible material for spreading on a marching surface, and means for providing tactile reference of a preselected height above the material of the marching surface at spaced intervals of a desired marching step length along said runner to a person marching along said runner, said tactile reference means including means defining a plurality of marker ridges at regular spaced intervals fixed along the runner for engagement by the feet of a person marching along the guide to indicate proper step length, said ridges having sufficient height to cause a tactile response in a person stepping upon one of said ridges.

2. A marching guide according to claim 1 wherein said ridge defining means comprises a plurality of rod or rope lengths positioned transversely to the longitudinal axis of the runner, and means for attaching said rod or rope lengths thereto.

3. A marching guide according to claim 1 wherein said ridge defining means comprise a plurality of rope lengths positioned transversely to the longitudinal axis of the runner and ribbons of webbing overlaying the rope lengths and secured to said runner to hold said rope lengths in place.

4. A marching guide according to claim 1 further including a plurality of rods and means removable securing them to said runner at spaced intermediate locations therealong to define additional marker ridges at half step intervals.

5. A marching guide according to claim 1 including a plurality of tabs along edges of the runner for securing the guide to the marching surface.

6. A marching guide according to claim 5 wherein said tabs comprise loops whereby the guide may be taped or staked to the marching surface.

7. A marching guide for instructing step length in marching, comprising:
an elongate runner of flexible material for spreading on a marching surface;
a plurality of elongate pace marker members for providing tactile reference, said marker members comprising a plurality of rope lengths having a predetermined thickness sufficient to cause a tactile response in a person stepping upon one of said marker members; and
means for attaching said marker members to said runner and for holding said marker members in a generally linear shape transversely to the longitudinal axis of the runner, and at spaced intervals corresponding to the step length, said attaching means including a ribbon of material overlaying each of said rope lengths, each ribbon being secured to said flexible material adjacent a respective rope length on either longitudinal side of the rope length.

8. A marching guide according to claim 7 including a plurality of fastener means positioned at both edges of the top side of the runner at one end thereof and a plurality of mating fastener means at both edges of the bottom side of the runner at the other end thereof, whereby a plurality of marching guide sections can be attached end to end in linear or angular relationship to form a marching pattern.

9. A marching guide according to claim 8 wherein said runner has a width substantially equal to the step length to facilitate right angle attachment of marching guide sections.

10. A marching guide according to claim 8 wherein said fastening means comprise patches of hook and pile type fasteners.

11. A marching guide according to claim 9 wherein said runner is made of reinforced vinyl.

12. A marching guide according to claim 7 wherein said ribbons are made of nylon webbing.

13. A marching guide according to claim 7 wherein said ribbons are sewn to said runner.

14. A marching guide according to claim 7 including a plurality of rods or dowels and means removably securing them to said runner at spaced intervals intermediate adjacent rope marker members to define half step marker members.

15. A marching guide according to claim 14 including means defining loops on the underside of said runner for removably receiving the rods or dowels.

16. A marching guide according to claim 15 including a ribbon extending longitudinally of said runner and secured thereto except for gaps defining loops at said half step intervals for removably receiving said rods or dowels.

17. A marching guide for instructing step length in marching, comprising an elongate runner of flexible material for spreading on a marching surface, means for providing tactile reference of a preselected height above a marching surface at spaced intervals of a desired marching step length along said runner to a person marching along said runner, said tactile reference means including means defining a plurality of marker ridges at regular spaced intervals fixed along the runner for engagement by the feet of a person marching along the guide to indicate proper step length, said ridges having sufficient height to cause a tactile response in a person stepping upon one of said ridges, and attachment means positioned at ends of the runner for attaching one guide to another to make an extended marching guide, said attachment means including a plurality of fastener means at both edges of the top side of the runner at one end thereof, and a plurality of mating fastener means at both edges of the bottom side of the runner at the other end thereof, whereby a plurality of marching guide sections can be attached end to end in linear or angular relationship to form a marching pattern.

18. A marching guide for instructing step length in marching, comprising an elongate runner of flexible material for spreading on a marching surface, means for providing tactile reference of a preselected height above a marching surface, said tactile reference means being disposed at spaced intervals of both full and half marching step length along said runner, said tactile reference means including a plurality of rope lengths having a predetermined thickness sufficient to cause a tactile response in a person stepping upon one of said rope lengths to thereby indicate proper full or half step length, means for attaching said rope lengths to a bottom surface of said flexible material, said attaching means including a ribbon of material overlaying each of said rope lengths, each ribbon being secured to said flexible material adjacent a respective rope length on either longitudinal side of the rope length, a plurality of fastener means at both edges of the top side of the runner at one end thereof, and a plurality of mating fastener means at both edges of the bottom side of the runner at the other end thereof whereby a plurality of marching guides, can be attached end to end in a linear or an angular relationship to form a marching pattern.

* * * * *